United States Patent [19]

Fischer

[11] Patent Number: 4,900,504
[45] Date of Patent: Feb. 13, 1990

[54] METHOD OF EXTRUSION BLOW MOLDING FLAT BOTTLES

[76] Inventor: Rainer Fischer, Postrasse 39, 3530 Warburg 2, Fed. Rep. of Germany

[21] Appl. No.: 130,230
[22] PCT Filed: Jan. 30, 1987
[86] PCT No.: PCT/DE87/00033
 § 371 Date: Nov. 30, 1987
 § 102(e) Date: Nov. 30, 1987
[87] PCT Pub. No.: WO87/04661
 PCT Pub. Date: Aug. 13, 1987

[30] Foreign Application Priority Data

Jan. 31, 1986 [DE] Fed. Rep. of Germany ....... 3602990

[51] Int. Cl.⁴ ...................... B29C 49/64; B29C 49/18; B29C 49/50
[52] U.S. Cl. .................................. 264/529; 264/530; 264/536; 264/542; 425/530; 425/531; 425/534
[58] Field of Search ............... 264/529, 530, 531, 534, 264/536, 540, 542; 425/525, 527, 530, 531, 532, 534, 535

[56] References Cited

U.S. PATENT DOCUMENTS

| | | | |
|---|---|---|---|
| 3,012,286 | 12/1961 | Gasmire | 264/529 |
| 3,781,395 | 12/1973 | Uhlig | 264/530 |
| 3,989,784 | 11/1976 | Uhlig | 264/327 |
| 4,199,129 | 4/1980 | Fisher | 264/534 |

FOREIGN PATENT DOCUMENTS

| | | |
|---|---|---|
| 2446178 | 4/1975 | Fed. Rep. of Germany . |
| 1382252 | 11/1963 | France . |
| 2025368 | 11/1969 | France . |
| 2256819 | 1/1975 | France . |
| 2389480 | 5/1978 | France . |

Primary Examiner—Jan H. Silbaugh
Assistant Examiner—Neil M. McCarthy
Attorney, Agent, or Firm—Henry M. Feiereisen

[57] ABSTRACT

A method of making flat bottles with flat or concave bottom by free extrusion of a plastic tube includes blowing of an intermediate form with circular cross section and shaping the latter essentially mechanically to the flat bottle at simultaneous final blowing for achieving clean radii. It is essential that the intermediate form is blown at a length corresponding to about the height of the flat bottle, with a circumference in the body area of −1 to about −10%, however, in the bottom near area of the side walls from 0 to about +15%, with regard to the corresponding circumference of the flat bottle. The radius of curvature at the junction from the body wall to the bottom should correspond to about the radius of curvature at the junction from the body wall of the broad side of the flat bottle to its bottom. The bottom part corresponding to the pinched end of the tube is pinched off during shaping.

7 Claims, 2 Drawing Sheets

METHOD OF EXTRUSION BLOW MOLDING FLAT BOTTLES

BACKGROUND OF THE INVENTION

For producing hollow plastic articles with rotationally symmetric cross section along their entire length and their entire height, respectively, e.g. round bottles, an extruded tube is generally used having a diameter which corresponds for example to the diameter of the neck of the hollow article to be produced and a wall thickness which exceeds the wall thickness of the finished hollow article. The tube is blown up in a blowing mold to the finished hollow article without experiencing an irregular wall thickness distribution.

For hollow articles with a cross section deviating from the circular cross section like e.g. flat bottles, a production in this manner is not applicable as correctly reasoned in detail in the US-PS No. 3,892,829. Therefore, the mentioned US-PS provides a separate intermediate mold station in which an intermediate form is produced the length of which being considerably smaller than the height of the flat bottle and the surface of which being 25% smaller than the surface of the flat bottle to be produced. Only then can it be prevented during shaping of the intermediate form to the finished flat bottle in a final blowing mold that parts of the intermediate form are squeezed between both mold halves of the final blowing mold during their closing and that so-called dog-ears are obtained. The thus necessary biaxial stretching of the plastic material leads, however, to an irregular wall thickness distribution over the circumference of the flat bottle because the stretching occurs exclusively in the surface areas which do not yet bear against the cooled inner wall surface of the final blowing mold, thus preferably in the area of the narrow sides and the bottom of the flat bottle. In order to maintain a sufficient wall thickness, it is necessarily required to work with a surplus of material. The finished flat bottle has therefore an unnecessarily great wall thickness in the area of both its broad sides. Apart from the thus redundantly great material consumption such an excessive wall results in an extended cycle period since evidently the cooling period is dependent on the area with the greatest material strength. This fact is in particular relevant when the intermediate form is not produced from a preform which is injected-molded around a hollow mandrel but is made from a freely extruded tube since the tube end sealed through pinching is arranged in the bottom of the intermediate form and the flat bottle, respectively, and causes there an especially high material accumulation. The method could not succeed in practice. Rather, the production of flat bottles with or without grip is usually accomplished through a tube blowing method in which an extruded tube is used with a circumference nearly equal to the greatest circumference of the flat bottle to be produced. The tube is continuously extruded in suspended position with a wall thickness desired for hollow articles and, after attaining a length corresponding to the height of the flat bottle, is transferred to a blowing mold in which the tube-like preform is blown up to the final flat bottle by means of a blow pin. The blow pin simultaneously calibrates neck and mouth of the bottle while the blowing mold during closing has already pinched off the considerable extra material portion especially in the neck area and shoulder area.

Since depending on the shape of the flat bottle the pinched off material portion may amount from 10% up to 25% and more of the weight of the finished bottle, this type of production is relatively uneconomic since the need of machinery, especially, however, the power demand for drive, heating and cooling of the extrusion blow-molding apparatus is considerably higher than is necessary for the production of the actual flat bottle because the pinched-off material portion, too, must certainly be liquefied at first and then also cooled and a separate punching apparatus for its removal from the flat bottle as well as transport apparatus and regenerating apparatus for reprocessing the waste material are required.

The DE-PS 27 20 448 discloses an apparatus for production of flat bottles which includes a blowing mold essentially provided with two mold halves wherein each mold half includes two mold parts movable perpendicular to the parting plane of the mold with one mold part forming the neck, the narrow sides and the bottom of the flat bottle, and the other mold part forming the broad sides of the flat bottle. A tube-extruded or injection-molded preform is used with a diameter approximately equal to the neck diameter of the flat bottle. The preform is blown up to the flat bottle during closing of the mold wherein the closing step proceeds in such a manner that initially the respective first or outer mold parts of both mold halves are closed. This material-saving process requires, however, a very precisely controlled blowing action. Further, the problem of undesired material accumulation in the bottom of the flat bottle still cannot be overcome when using an extruded preform. The method results in an essentially uniform wall thickness only in flat bottles whose radii of curvature is not too small because in these cases the material will still be stretched in the respective edge areas and corner areas upon already completely closed mold. It should be considered, however, that a relevant part of flat bottles used in the market and demanded from fillers have relatively sharp edges and thus small radii of curvature. In view of its costs, an blow-molding apparatus must basically, i.e. after installation of the respective blowing molds, be capable to produce all conventional flat bottles.

SUMMARY OF THE INVENTION

The invention is thus based on the object to create a method of producing flat bottles and an apparatus for carrying out the latter which allow the production of flat bottles in all conventional designs with nearly uniform wall thickness at least over the major part of its height, that is from bottom to shoulder, in a material-saving way and at short cycle periods.

In accordance with the invention, this object is attained by the method stated in patent claim 1. In contrast to conventional wisdom, the solution is based on the teaching that the intermediate form which is known per se must have a greater circumference in the area of its junction in the bottom than the finished flat bottle in the same area in order to achieve the required wall thickness in the corners of the flat bottle, that is at a location where a respective broad side coincides with a narrow side and the bottom. The circumference of the body of the intermediate form changes continuously from a normally slight undersize relative to the respective circumference of the flat bottle in direction to the bottom to a usually slight oversize ($<15\%$) with the oversize being dependent in the individual case on how effectively the radii of curvature mentioned in the characterizing part of claim 1 approach each other, on the one hand, and on how long the pinching edge of the bottom part pinched off during forming to the flat bottle is, on the other hand.

By further developing the method as stated in claim 2, the shaping of the bottom of the flat bottle can be optimized.

With regard to the apparatus, the object upon which the invention is based is attained by the features stated in claim 5. In this connection, the invention is based on an extrusion blow-molding apparatus according to the US-PS 3,892,829, however, in an embodiment operable with a freely extruded tube. Still, the presently proposed method can be carried out only with a final blowing mold essentially known per se from the DE-PS 27 20 448.

BRIEF DESCRIPTION OF THE DRAWING

The following example describes the method according to the invention with reference to the drawing in which.

DETAILED DESCRIPTION OF PREFERRED EMBODIMENTS

Figure 1:
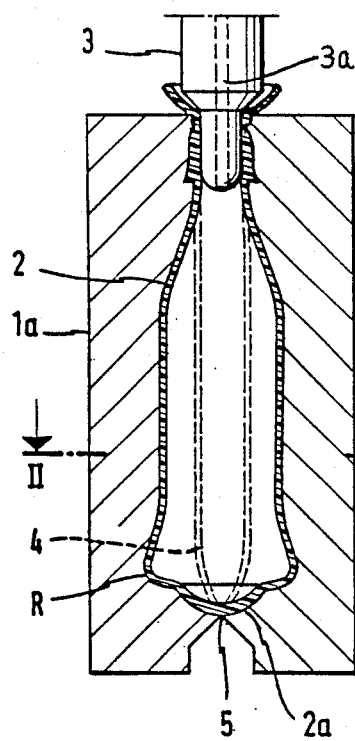
FIG. 1 is a longitudinal section through the intermediate blowing mold.
Figure 2:
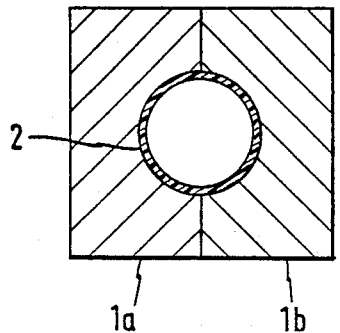
FIG. 2 is a cross section through the intermediate blowing mold taken along the line II—II in FIG. 1.

FIGS. 1 and 2 show a longitudinal section and a cross section of an intermediate mold including two mold halves 1a and 1b movable perpendicular to their parting plane and defining a mold cavity in which an intermediate form 2 is blown by means of a blow pin 3 out of an extruded plastic tube 4 indicated in broken line. The plastic tube 4 has been freely extruded previously either continuously or by means of an extruder screw, closed at its lower end and for its stabilization slightly pre-blown preferably during the extrusion so as to receive in reality a slightly oval shape in longitudinal section before being transferred to the intermediate mold 1a, 1b and blown to the illustrated intermediate form 2.

The intermediate mold 1a, 1b is provided above its cutting edge 5 in the bottom of the mold with a calotte-shaped depression for receiving the material accumulation necessarily occurring at the pinch-off edge of the plastic tube 4. The depression may, however, be cup-shaped in the event the pinched off material accumulation should be of larger volume. Subsequently arranged thereto toward the outside is an only slightly convex bottom area. In addition, the intermediate mold halves 1a and 1b define a mold cavity which produces an intermediate form 2 with a mouth and neck area completely or nearly completely corresponding to the respective parts of the finished flat bottle while the circumference of the intermediate form (and of the mold cavity, respectively) is dimensioned in the shoulder and body area up to about 10% smaller and in the bottom near area up to 15% greater than the respective circumference of the flat bottle. The diametrical variations are—as illustrated—continuously. In the event the shoulder area of the flat bottle to be produced has characteristic edges, the intermediate form must also be provided there with a circumference greater by few percent than the finished bottle has at the same level.

Basically, the circumferential overdimension of the intermediate form is the greater the more characteristic the edges and corners of the finished bottle. Only then, thinning of the wall thickness and possibly even appearance-impairing swellings of these critical areas are prevented.

Furthermore, the radius of curvature R at the junction of the body wall to the bottom of the intermediate form is about equal to the radius of curvature of the corresponding junction of the flat bottle to be produced.

The length of the intermediate form (and of the form cavity of the intermediate mold, respectively) is almost equal to the height of the flat bottle to be produced, provided that the calotte-shaped center piece 2a is not considered upon determination of the length because it is pinched off due to the contained material accumulation so that material as well as cooling time is saved.

Figure 3:
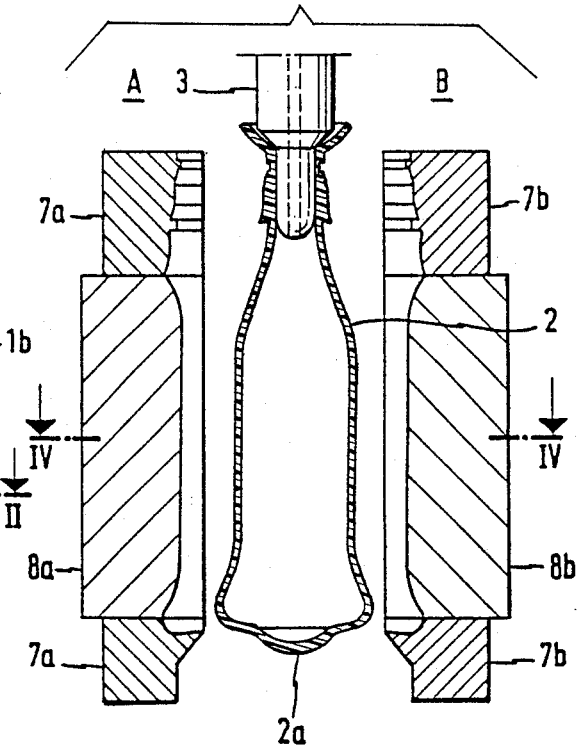
FIG. 3 is a longitudinal section through the opened final blowing mold.
Figure 4:
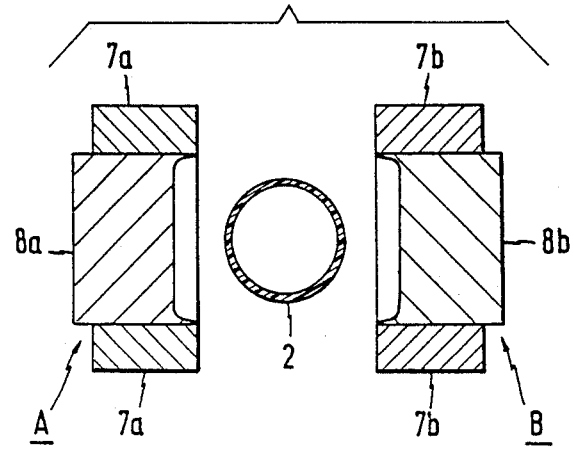
FIG. 4 is a cross section through the opened final blowing mold taken along the line IV—IV in FIG. 3.
Figure 5:
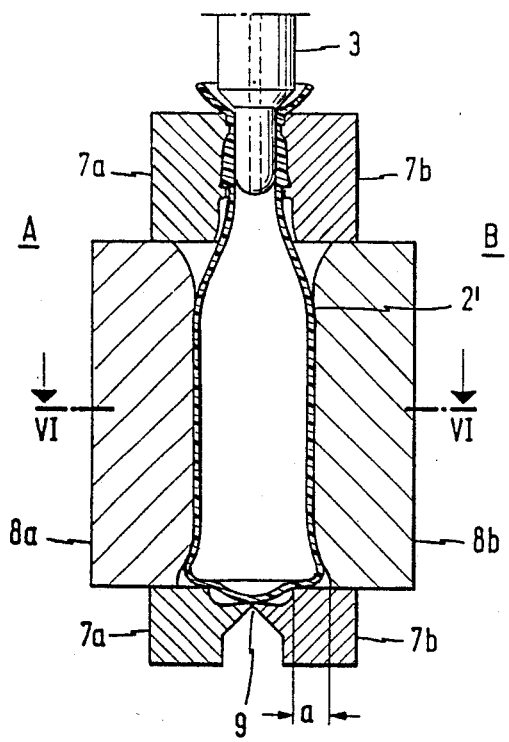
FIG. 5 is a longitudinal section through the partially closed final blowing mold and FIG. 6 is a cross section through the partially closed final blowing mold taken along the line VI—VI in FIG. 5.
Figure 6:
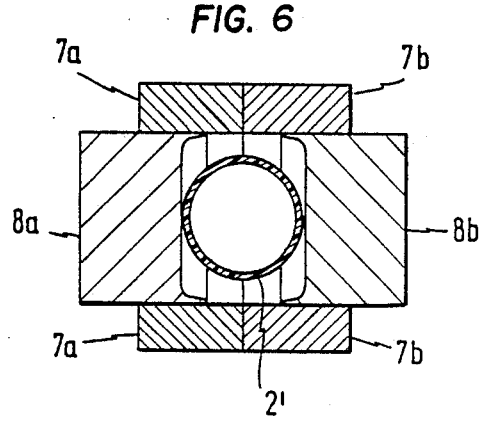

This sizing of the intermediate mold 1a, 1b and of the intermediate form 2, respectively, allows the latter to be shaped to the finished flat bottle within a final blowing mold without experiencing any relevant material stretching and thus variations of the wall thickness. The initial position of this forming process is illustrated in FIGS. 3 and 4 while the intermediate position is shown in FIGS. 5 and 6. A precondition for this shaping is the application of a final blowing mold which consists of four parts and includes two mold halves A and B shiftable perpendicular to the parting plane of the mold and each of which including two mold halves 7a, 7b and 8a, 8b. The mold halves 7a, 7b are movable toward each other independently from the mold halves 8a, 8b. The mold halves 8a, 8b are slidably guided in the mold halves 7a, 7b so that the latter define an outer frame whereby the parting plane extends preferably in the area of the narrow radii of the finished flat bottle.

FIGS. 3 and 4 illustrate the transfer position in which the intermediate form of FIGS. 1 and 2 still suspending from the blow pin 3 is disposed between the open mold halves A and B.

Figure 7:
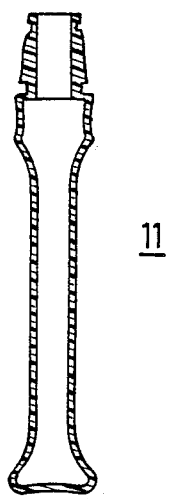
FIG. 7 is a section of the flat bottle along its short transverse axis and FIG. 8 is a section of the flat bottle along its long transverse axis.
Figure 8:
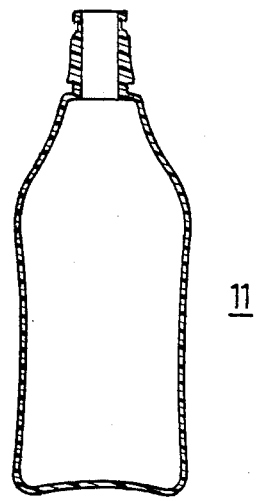

FIGS. 5 and 6 depict the state after closing the frame-like mold halves 7a, 7b and the partial closing of the mold halves 8a, 8b. At this stage, the cutting edge 9 provided in the bottom parting plane of the frame-like mold halves 7a, 7b has already severed the calotte-shaped, thickened center piece of the intermediate form 2'. The diameter of this thickened center piece 2a (and, respectively, the calotte-shaped depression providing the latter and arranged in the mold bottom of the intermediate form) is dimensioned in such a manner that it is about half of the long axis of the bottom of the flat bottle. The inner mold parts 8a, 8b forming the later broad sides of the flat bottle, are just about in contact in the shown position with the intermediate form 2' which is kept at sufficient internal pressure by sealing off the blow air channel 3a of the blow pin 3 by means of a not shown valve. Consequently, the bottom area of the intermediate form 2' begins already to bear against the contour of the frame-like mold parts 7a, 7b. Despite comparable appearance, this "pre-bottom" is thus not the thickened calotte-shaped center piece 2a of the bottom of the original intermediate form 2. Subsequently, the inner mold parts 8a, 8b are closed by the remaining displacement path as designated with "a". Thus, the intermediate form 2' nearly conforms to the contour of the finished flat bottle 11 which is illustrated in a sectional view in FIG. 7 along its short transverse axis and in a sectional view in FIG. 8 along its long transverse axis. For that, the final blowing mold is moved under a final blow pin and acted upon with full final blow pressure. The final blow pin is of same design as the blow pin 3 and thus not illustrated. After the cooling period, the final blowing mold is opened and the flat bottle 11 is ejected.

In the above-described method, the final blowing mold receives the intermediate form from the intermediate blow station after opening and removing of the intermediate blowing mold 1a, 1b from the blow pin 3, is closed at least partially, preferably however completely and is moved into the final blow station beneath the final blow pin.

A modification of this method avoids a too strong cooling of the intermediate form in this phase i.e. from the transfer to the final blowing mold beneath the blow pin 3 until being acted upon by pressure by means of the final blow pin. This modification recommended when temperature sensitive plastics are concerned is attained by completely closing the final blowing mold 7a, 7b, 8a, 8b in any event when being in the transfer position beneath the blow pin 3 and by allowing the full final blow pressure to act at least momentarily upon the intermediate form 2 by means of the blow pin 3 so that the intermediate form 2 is already completely shaped in this intermediate blow station to the flat bottle 11. In this manner, surface irregularities are prevented in view of premature cooling. The final blowing mold is then transferred to the final blow station beneath the final blow pin which injects compressed air to act again upon the flat bottle 11 during the remaining cooling period. In this in a way two-step final blowing, the first step (by means of the blow pin 3) should be kept as short as possible in order to prevent a lengthening of the cycle period in view of the time the final blowing mold is kept in the intermediate blow station.

While the invention has been illustrated and described as embodied in a Method of and Extrusion Blow-Molding Apparatus for Producing Flat Bottles, it is not intended to be limited to the details shown since various modifications and structural changes may be made without departing in any way from the spirit of the present invention.

What is claimed as new and desired to be protected by Letters Patent is set forth in the appended claims:

1. A method of making a flat bottle with a broad side and a narrow side and defined by a height and having a flat or concave bottom; comprising the steps of:
   extruding a plastic tube;
   blow-molding the plastic tube in an intermediate mold to provide an intermediate form at a length corresponding to about the height of the flat bottle, wherein the intermediate form has a body with a circumference being smaller than a corresponding circumference of the flat bottle by 1% to about 10% and a bottom area with a circumference effectively exceeding a corresponding circumference of the flat bottle by up to about 15%, and wherein the intermediate form has at the junction of the body and the bottom a radius of curvature which approximately corresponds to about a radius of curvature at the junction of the body of the broad side of the flat bottle and the bottom thereof; and transferring said intermediate form to a final blow mold and shaping the intermediate form to a finished flat bottle without any substantial material stretching and pinching off a bottom part of said intermediate form during said shaping step.

2. A method as defined in claim 1 wherein said intermediate form is of circular cross section.

3. A method as defined in claim 1 wherein the bottom is defined by a long axis, said blow-molding step including providing the intermediate form with a bottom having a large, slightly convex radius of curvature at its border area and a calotte-shaped center piece with a diameter approximately corresponding to half the long axis of the bottom of the flat bottle.

4. A method as defined in claim 1 wherein said blow-molding step includes blowing the intermediate form in shoulder area with a circumference from up to +10% of the circumference of the flat bottle at a corresponding area thereof.

5. A method as defined in claim 1 wherein said shaping step is attained in two steps and includes maintaining the intermediate form at sufficient internal pressure so that the intermediate form begins to conform to the contour of the final bottle, and then subjecting the intermediate form to an increased final blow pressure.

6. A method as defined in claim 5 wherein said maintaining step includes using a same blow pin as used for blow-molding the intermediate form.

7. A method as defined in claim 1 wherein said shaping step includes subjecting the intermediate form to an increased final blow pressure so that the intermediate form already conforms to the contour of the final bottle, allowing the intermediate form to the increased final blow pressure during said cooling step.

* * * * *

UNITED STATES PATENT AND TRADEMARK OFFICE
CERTIFICATE OF CORRECTION

PATENT NO. : 4,900,504
DATED : February 13, 1990
INVENTOR(S) : Rainer FISCHER

It is certified that error appears in the above-identified patent and that said Letters Patent is hereby corrected as shown below:

Column 6, line 53, after "form" add -- to cool down and further subjecting the intermediate form --.

Signed and Sealed this

Twenty-eighth Day of May, 1991

Attest:

HARRY F. MANBECK, JR.

Attesting Officer

Commissioner of Patents and Trademarks